US011935263B1

(12) United States Patent
Kurz

(10) Patent No.: US 11,935,263 B1
(45) Date of Patent: Mar. 19, 2024

(54) GLOBAL REFERENCE DIRECTION DETECTION FOR ORIENTING THREE-DIMENSIONAL MODELS

(71) Applicant: Apple Inc., Cupertino, CA (US)

(72) Inventor: Daniel Kurz, Hilo, HI (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 17/718,816

(22) Filed: Apr. 12, 2022

Related U.S. Application Data

(60) Provisional application No. 63/176,924, filed on Apr. 20, 2021.

(51) Int. Cl.
  *G06T 7/70* (2017.01)
  *G06T 7/80* (2017.01)
  *G06T 17/05* (2011.01)

(52) U.S. Cl.
  CPC ............... *G06T 7/70* (2017.01); *G06T 7/80* (2017.01); *G06T 17/05* (2013.01)

(58) Field of Classification Search
  CPC ............ G06T 7/70; G06T 7/80; G06T 17/05
  See application file for complete search history.

(56) References Cited

U.S. PATENT DOCUMENTS

| | | | |
|---|---|---|---|
| 9,251,590 B2 | 2/2016 | Sharp et al. | |
| 10,489,927 B2 | 11/2019 | Giancola et al. | |
| 10,904,454 B2 | 1/2021 | Sheldon et al. | |
| 2011/0018990 A1* | 1/2011 | Komoto | H04N 23/843 348/208.99 |
| 2011/0275408 A1* | 11/2011 | Kulik | G01S 19/23 455/556.1 |
| 2014/0022539 A1* | 1/2014 | France | G01C 3/08 701/1 |
| 2015/0226827 A1* | 8/2015 | Aycock | G06V 20/00 382/103 |
| 2019/0147619 A1* | 5/2019 | Goldman | G01B 11/03 382/154 |

FOREIGN PATENT DOCUMENTS

WO   WO 2020261255 A1 * 12/2020 ............ G01C 21/02

OTHER PUBLICATIONS

Lambert, Andrew, Furgale, Paul, Barfoot, Timothy D., Enright, John; "Field Testing of Visual Odometry Aided by a Sun Sensor and Inclinometer"; Journal of Field Robotics, pp. 1-19; wileyonlinelibrary.com, DOI: 10.1002/rob.21412; Oct. 19, 2011.
Caulfield, Darren; "Direction of Camera Based on Shadows", Final Year Project, May 2003; pp. 1-56.

* cited by examiner

*Primary Examiner* — Ryan R Yang
(74) *Attorney, Agent, or Firm* — Thompson Hine LLP

(57) ABSTRACT

Various implementations disclosed herein include devices, systems, and methods that determine an orientation of a three-dimensional (3D) model with respect to a global reference direction. For example, an example process may include obtaining an image from an image sensor, determining an orientation of the image sensor with respect to the direction of a celestial element, determining an orientation of the image sensor with respect to a global reference direction based on the orientation of the image sensor with respect to the direction of the celestial element and a relationship between the direction of the celestial element and the global reference direction, obtaining a 3D model of the physical environment, determining an orientation of the image sensor with respect to the 3D model, and determining an orientation of the 3D model with respect to the global reference direction.

20 Claims, 6 Drawing Sheets

GLOBAL REFERENCE DIRECTION DETECTION FOR ORIENTING THREE-DIMENSIONAL MODELS

CROSS-REFERENCE TO RELATED APPLICATIONS

This application claims the benefit of U.S. Provisional Application Ser. No. 63/176,924 filed Apr. 20, 2021, which is incorporated herein in its entirety.

TECHNICAL FIELD

The present disclosure generally relates to three-dimensional content, and in particular, to systems, methods, and devices that determine the orientation of three-dimensional content with respect to a global reference direction.

BACKGROUND

Various electronic devices use three-dimensional (3D) models of physical environments, e.g., a 3D reconstruction including a textured mesh or a sparse point cloud of a real-world object, room, or scene. For example, such a 3D model may be used in providing an extended reality (ER) experience in which views the physical and/or virtual content are provided based on the 3D models. In some instances, it may be desirable to orient a 3D model with respect to a global reference direction (e.g., true north) in the physical environment, e.g., determining that a depiction of a wall in a 3D reconstruction faces true north. Existing techniques for orientating 3D models may use information about the orientation of a camera that captured the images from which the 3D models are generated. Such techniques may lack accuracy in various circumstances. For example, such techniques may lack accuracy in indoor and other environments in which camera-attached sensors such a magnetometers lack accuracy. Thus, it may be desirable to provide a means of efficiently providing direction detection for orienting 3D models.

SUMMARY

Various implementations disclosed herein include devices, systems, and methods that determine a three-dimensional (3D) model's orientation with respect to a direction in the physical environment. For example, implementations described herein orient a 3D model with respect to a global reference direction (e.g., true north) based on image data that includes an indicium of a celestial element (e.g., sun, moon, North Star). This may involve determining a camera's orientation relative to the direction of the sun based on where the sun is depicted in an image, determining the camera's orientation relative to true north based on where true north currently is relative to the current sun direction, and using this camera orientation relative to true north to orient 3D models generated using the camera's orientation relative to true north. The 3D model may be a 3D reconstruction including a textured mesh or a sparse point cloud of a real-world object, room, or scene. Alternatively, the 3D model may be planar, i.e., representing only the (planar) floor of a room, or only one (planar) wall or (planar) painting on the wall.

As an exemplary implementation, given a current date and time, and a current (approximate) longitude and latitude of the camera (e.g., from GPS, Wi-Fi, etc.), processes described herein can compute angles (e.g., azimuth and altitude) with respect to true north the sun currently is located. Thus, if the sun is observed directly in at least one camera image, and the pose of that camera image with respect to the real-world object, room, or scene represented by the 3D model is known, then processes described herein can derive the orientation of the 3D model with respect to true north. Additionally, or alternatively, the orientation of the sun can be determined from other information in at least one tracked camera image (e.g., based on a casted shadow), then that information could also be utilized to determine the orientation of the 3D model with respect to true north.

Orienting a 3D model with respect to a global reference direction, e.g., true north, can provide numerous advantages. For example, once such an orientation is known, an electronic device can match its current view of the physical environment with the 3D model to determine the current orientation of the electronic device relative to the 3D model and use the known orientation of the 3D model relative to the global reference direction to determine the device's current orientation in the physical environment, e.g., which direction is true north. Increased orientation accuracy may be provided, for example, compared to orientation that is provided by consumer-grade magnetometers, especially in indoor and other low accuracy circumstances. Accurately determining orientation in the physical environment may also facilitate navigation applications and applications, such as extended reality applications, that superimpose indications of where points of interest are (e.g., landmarks, cities, planets and stars, etc.).

Accurately determining orientation in the physical environment may also facilitate use of 3D models. For example, multiple 3D models (e.g., of two adjacent rooms) may be used in providing an extended reality (ER) environment. In one example, many 3D models are positioned in a large ER environment (e.g., corresponding to an entire neighborhood, city, country, or even planet), and accurately-determined orientations of the 3D models relative the physical environment may improve user experiences within that ER environment. Accurately-determined orientations of the 3D models may facilitate merging multiple local 3D models into a single global 3D model.

Another advantage is that 3D model scanning and orientation estimation can be decoupled. For example, a user might have scanned his or her room in some circumstances, such as during the night or a very cloudy day, such that the 3D model initially cannot be oriented in the physical environment. However, once the user uses the 3D model again during daylight on a sunny day, processes described herein can associate the 3D model and determine the orientation of the 3D model with respect to a global reference direction without having to rescan the entire room.

In general, one innovative aspect of the subject matter described in this specification can be embodied in methods, at a device having a processor and an image sensor, that include the actions of obtaining an image from the image sensor, wherein the image includes a depiction of a physical environment, the depiction including indicium of a direction of a celestial element, determining an orientation of the image sensor with respect to the direction of the celestial element based on the indicium, determining an orientation of the image sensor with respect to a global reference direction based on the orientation of the image sensor with respect to the direction of the celestial element and a relationship between the direction of the celestial element and the global reference direction, obtaining a three-dimensional (3D) model of the physical environment, determining an orientation of the image sensor with respect to the 3D model, and determining an orientation of the 3D model with respect to the global reference direction based on the orientation of the image sensor with respect to the 3D model and the orientation of the image sensor with respect to the global reference direction.

These and other embodiments can each optionally include one or more of the following features.

In some aspects, the method further includes determining the relationship between the direction of the celestial element and the global reference direction based on a current time, a current date, and a current geographic location of the image sensor. In some aspects, a location of the celestial element in the image is detected based on the indicium. In some aspects, the indicium of the direction of the celestial element includes a casted shadow or a ray of light defined by an object in the physical environment.

In some aspects, determining the orientation of the image sensor with respect to the direction of the celestial element based on the indicium is based on detecting the location of the celestial element in the image. In some aspects, determining the orientation of the image sensor with respect to the direction of the celestial element is based on the detected location of the celestial element in the image and intrinsic camera parameters of the image sensor.

In some aspects, the 3D model is a first 3D model, and the method further includes obtaining a second 3D model of at least part of the physical environment, determining an orientation of the image sensor with respect to the second 3D model, determining an orientation of the second 3D model with respect to the global reference direction based on the orientation of the image sensor with respect to the second 3D model and the orientation of the image sensor with respect to the global reference direction, and generating a third 3D model by merging the first 3D model and the second 3D model based on the orientation of each 3D model with respect to the global reference direction and the orientation of the image sensor with respect to the global reference direction.

In some aspects, the image is a first image, and the method further includes obtaining a second image from the image sensor, wherein the second image includes a second depiction of at least part of the physical environment that does not include indicium of a direction of a celestial element, determining an orientation of the image sensor while capturing the second image with respect to the 3D model, and determining an orientation of the image sensor while capturing the second image with respect to a global reference direction based on the orientation of the image sensor with respect to the 3D model and based on the orientation of the 3D model with respect to the global reference direction.

In some aspects, determining an orientation of the image sensor with respect to the 3D model is based on matching features of the image with features of the 3D model to identify a current pose of the image sensor. In some aspects, determining an orientation of the image sensor with respect to the 3D model is based on minimizing a photometric error between the image and the 3D model. In some aspects, determining an orientation of the image sensor with respect to the 3D model is based on a machine learning model that regresses from the image to the position of parts of the model in the image. In some aspects, determining an orientation of the image sensor with respect to the 3D model is based on a machine learning model that regresses from the image to pose parameters to identify at least part of a current pose of the image sensor.

In some aspects, the global reference direction is a true north direction. In some aspects, the celestial element is one of the sun, the moon, and the North Star. In some aspects, the 3D model is based on one or more images from the image sensor. In some aspects, the 3D model is a 3D reconstruction based on at least one of a simultaneous localization and mapping (SLAM) map, a visual inertial odometry (VIO) map, and a 3D mesh.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
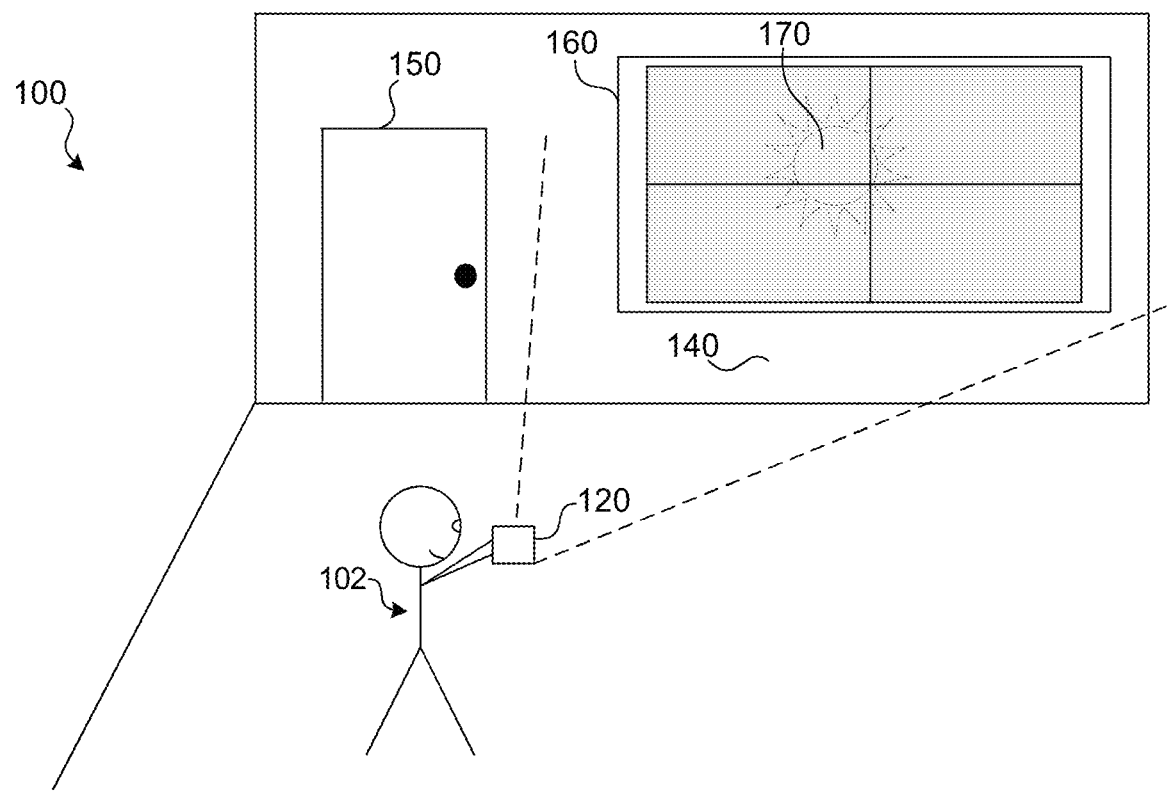
FIG. 1 is an example of a device used within a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100 in accordance with some implementations. The physical environment 100 includes a door 150 and a window 160. In additionally, a celestial element 170 (e.g., the sun) is within a view of the window 160 from the current perspective (and the current location, date, and time). Additionally, physical environment 100 includes user 102 holding electronic device 120. The electronic device 120 includes one or more cameras or other sensors that can be used to capture data used to generate a three-dimensional (3D) model of one or more surrounding portions of the physical environment, e.g., the door 150, the window 160, walls (i.e., surrounding wall 140), and/or other objects of the physical environment 100. For example, as the electronic device 120 is moved about within the physical environment, images, depth data, and other sensor data may be obtained and used to generate a point cloud, mesh, or other 3D model of one or more of the objects present in the physical environment. The 3D model may include one or more objects, one or more rooms, one or more buildings, etc. In some implementations, a generated 3D model is associated with a global reference direction (e.g., true north) of the physical environment via one or more of the techniques disclosed herein.

The electronic device 120 is illustrated as a single, handheld device. The electronic device 120 may be a mobile phone, a tablet, a laptop, and so forth. In some implementations, electronic device 120 is worn by a user. For example, electronic device 120 may be a watch, a head-mounted device (HMD), a head-worn device (glasses), headphones, an ear-mounted device, and so forth. The device 120 utilizes one or more display elements to present views. For example, the device 120 can display views that include content in the context of an extended reality (XR) environment. In some implementations, the device 120 may enclose the field-of-view of the user 102. In some implementations, the functionalities of device 120 are provided by more than one device. In some implementations, the device 120 communicates with a separate controller or server to manage and coordinate an experience for the user. Such a controller or server may be located in or may be remote relative to the physical environment 100.

In some implementations, functions of the device 120 are accomplished via two or more devices, for example a mobile device and base station or a head-mounted display and an ear-mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 120 may communicate with one another via wired or wireless communications.

Figure 2:
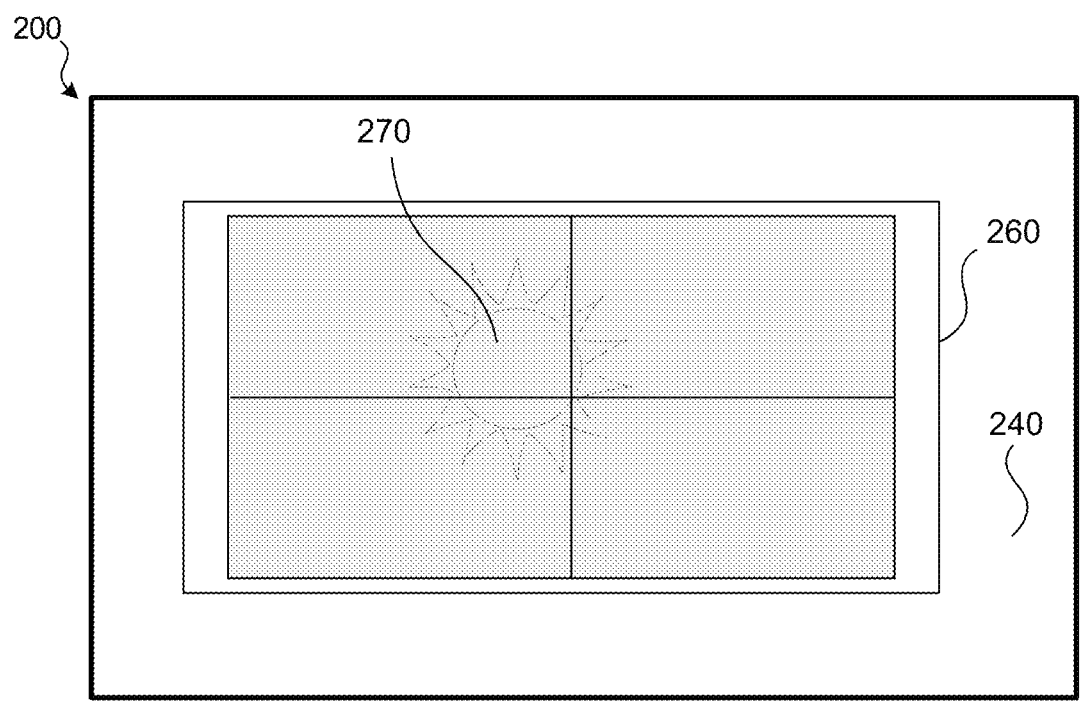
FIG. 2 illustrates an example image provided by an image sensor of the device of FIG. 1, the image including a celestial element, in accordance with some implementations.

FIG. 2 illustrates an example image 200. In particular, image 200 is an image (e.g., an RGB image) taken by user 102 using an image sensor (e.g., RGB camera) of device 120 of FIG. 1. As illustrated, image 200 includes image content that includes a depiction 270 of the celestial element 170 (e.g., the sun) and a depiction 260 of the window 160. Such an image may be used to generate a 3D model of one or more surrounding portions of the physical environment, e.g., the door 150, the window 160, walls, and/or other objects of the physical environment 100. For example, the depiction 260 of the window 160 and the depiction 240 of the surrounding wall 140 may be used to generate a 3D model of the room, e.g., the portion of the model corresponding to the window 160 and surrounding wall 140. The 3D model may be generated using multiple images and/or other sensor data. For example, data from a depth sensor corresponding to the image 200 may be used to determine the 3D positions of elements (e.g., points of a point cloud) representing the 3D positions of portions of the 3D model corresponding to the window 160 and surrounding wall 140. Images of other portions of the physical environment 100 (e.g., from other viewpoints) may be used generate other portions of the 3D model (e.g., other walls, objects, areas of adjacent rooms, outside areas, etc.). In some implementations, image 200 may also be used to estimate the orientation of the image sensor with respect to an existing 3D model of the physical environment.

Figure 3:
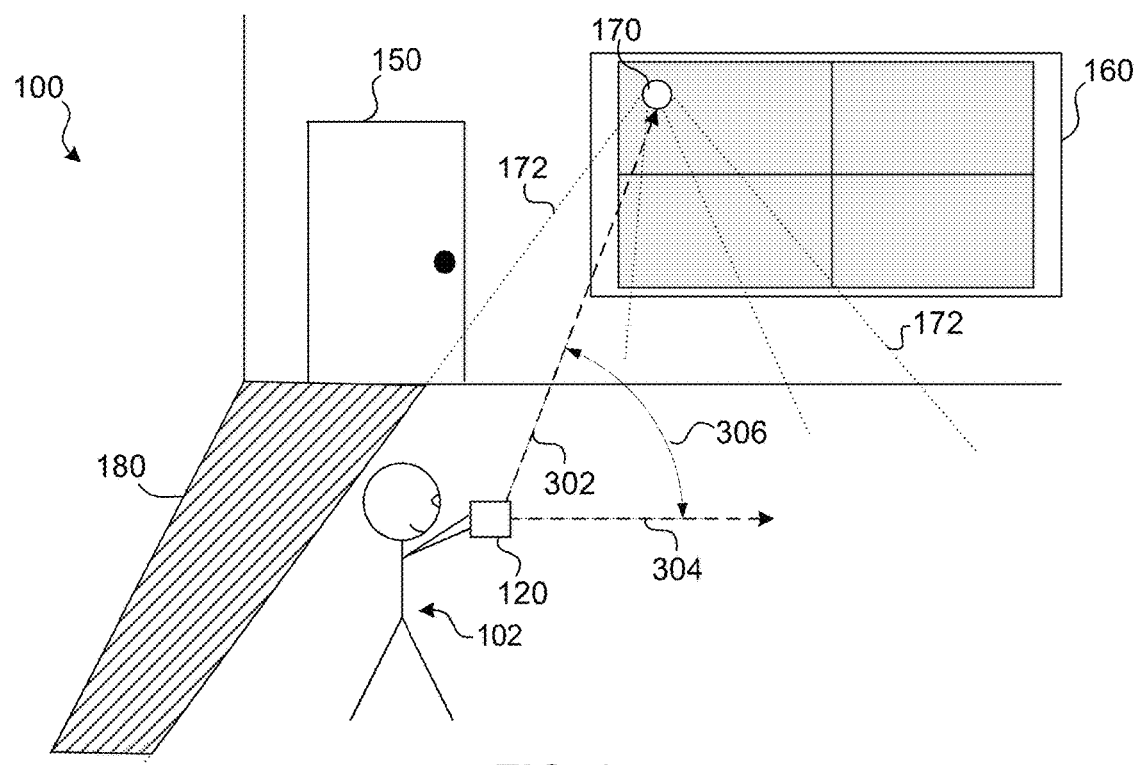
FIG. 3 is another example of the device of FIG. 1 used within a physical environment including an indicium of a direction of a celestial element and an orientation of an image sensor, in accordance with some implementations.
Figure 4:
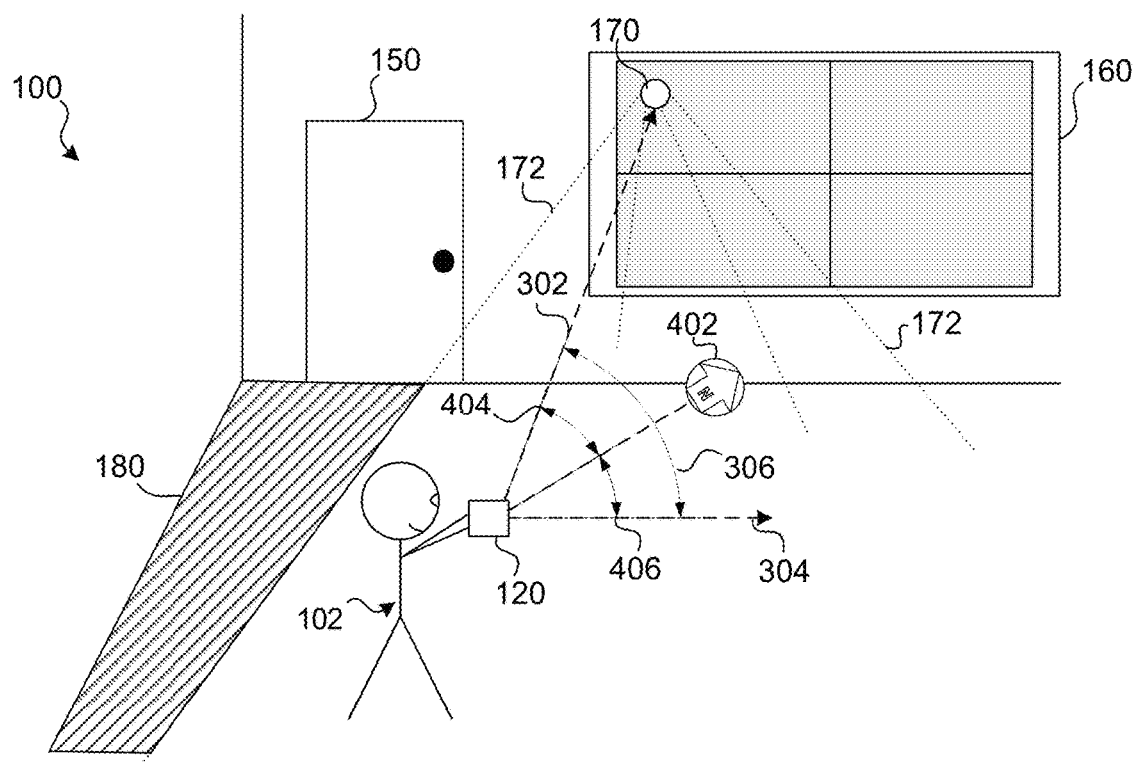
FIG. 4 is another example of the device of FIG. 1 used within a physical environment including an orientation of an image sensor with respect to a global reference direction, in accordance with some implementations.

In some implementations, a 3D model (of a physical environment) is associated with a global reference direction (e.g., true north) based on an image such as image 200 via one or more of the techniques disclosed herein. For example, depiction 270 of the celestial element 170 may be detected in the image 200 and ultimately used to determine a direction of the generated 3D model relative to the global reference direction of the physical environment 100, e.g., if an object in the physical object faces true north than a corresponding feature of the 3D model can be determined to face true north. FIGS. 3-4 illustrate such a determination of a global reference direction (e.g., true north) to associate with a direction within a 3D model, e.g., orienting the 3D model with respect to the global reference direction.

FIG. 3 illustrates directions 302, 304 that can be determined for an image (e.g., image 200 of FIG. 2) that is captured and may be used in generating a 3D model of one or more objects of the physical environment 100. These directions 302, 304 (e.g., their relationship to one another) may be determined as part of a process that orients the 3D model (e.g., to true north) in the physical environment. In some implementations, direction 302 from the electronic device 120 (e.g., its image sensor) to celestial element 170 at the time of image capture is determined from the corresponding image. Determining the direction 302 from the electronic device 120 (e.g., its image sensor) to celestial element 170 at the time of image capture may be based on detecting a depiction of the celestial element (e.g., depiction 270 of celestial element 170, e.g., the sun, in image 200) and determining the direction 302 based on the position of the depiction of the celestial element within the image. The direction 302 from the electronic device (e.g., its image sensor) to celestial element 170 at the time of image capture may be determined with reference to a reference direction.

In the example of FIG. 3, the reference direction is the direction 304 that the electronic device 120 (e.g., its image sensor) is aimed at the time of image capture (e.g. the camera's optical axis). Thus, based on the position of the depiction 270 of the celestial element 170 within the image 200, the direction 302 relative to the direction 304 at the time of image capture may be determined (e.g., an indicium of a direction of a celestial element). For example, if the depiction 270 of the celestial element 170 is positioned at the center of image 200, then the electronic device 120 is facing towards the celestial element 170 at the time of image capture (i.e., the direction 302 from the electronic device 120 to the celestial element 170 is the same as the direction 304 that the electronic device 120 (e.g., its image sensor) is aimed at the time of image capture. In another example, if the depiction 270 of the celestial element 170 is at a position on the left side of image 200, then the electronic device 120 is facing at an angle 306 (e.g., 40 degrees) to the right of the celestial element 170 at the time of image capture (i.e., the direction 302 from the electronic device 120 to the celestial element 170 is at the angle 306 (e.g., 40 degrees) to the left of the direction 304 that the electronic device 120 (e.g., its image sensor) is aimed at the time of image capture.

Alternatively, in some implementations, the celestial element 170 (e.g., the sun) is not present in the image, but visual features of the celestial element 170 are viewed in the physical environment and/or the captured image (e.g., light rays 172, shadow 180, and the like). For example, during the daytime, the sun may not be directly in view of the camera image, but sunlight rays (e.g., light rays 172) and/or corresponding shadows (e.g., shadow 180) maybe shown. Thus, when the celestial element 170 is not present in the view of the image sensors, but visual features of the celestial element 170 are in view, the processes described herein can utilize those visual features of the celestial element 170 to determine directions 302, 304 (e.g., their relationship to one another) as part of the process that orients the 3D model (e.g., to true north) in the physical environment. For example, shadow trajectory calculation techniques can be used to determine a location of the celestial element 170 based on, for example, the location and length of the shadow 180, elevation angle, azimuth angle, solar angle, the time of day, and the like. In some implementations, the visual features of the celestial element 170 (e.g., a depiction including an indicium of a direction of a celestial element) may include sunbeams, crepuscular rays, antisolar rays, or anticrepuscular rays.

FIG. 4 illustrates a global reference direction 402 (e.g., true north) in the physical environment of FIG. 3 that can be determined for an image (e.g., image 200 of FIG. 2) that is captured in the physical environment 100. Thus, the global reference direction 402 may be determined as part of a process that orients the 3D model (e.g., to true north) in the physical environment 100. The global reference direction 402 (i.e., at the time of image capture) may be determined along with or following determination of the direction 302 from the electronic device 120 (e.g., its image sensor) to the celestial element 170.

The global reference direction 402 (e.g., true north) may be determined based on relationship determined based on the expected relative positioning of celestial bodies (e.g., based on determined orbits, planetary rotations, etc.). For example, the global reference direction 402 (e.g., true north) may be determined relative to the known direction 302 from the electronic device 120 (e.g., its image sensor) to the celestial element 170 at a particular time of day and at the particular geographic location of the electronic device at the time of image capture. As a specific example, given the time and location of the image capture, an angle 404 (e.g., 15 degrees) between direction 302 and direction 402 may be known. This angle 404 can be used with the angle 306 to determine an angle 406 between the global reference direction 402 and the direction 304 that the electronic device 120 (e.g., its image sensor) is aimed at the time of image capture. For example, given that the direction 302 from the electronic device 120 to the celestial element 170 is 40 degrees left of the direction 304 that the electronic device is aimed and that the global reference direction 402 is 15 degrees to the right of the direction 302 from the electronic device to the celestial element 170, then it can be determined that the global reference direction 402 is 25 degrees to the left of the direction 304 that the electronic device 120 at image capture.

The global reference direction 402 (e.g., knowing that true north is 25 degrees left of the direction the electronic device 120 is aimed at image capture) can be used to orient a 3D model that is generated based on the image or that represents at least part of the physical environment depicted in the image. For example, the 3D model may include 3D representations of window 160 and surrounding walls. The global reference direction 402 (e.g., true north) may be defined within the 3D model, and thus identify whether the orientations of the 3D representations of window 160 and surrounding walls with respect to the global reference direction, e.g., which wall faces east, which wall faces true north, etc. In various embodiments, the angle between two directions can be defined and represented in different ways, including as the angle between the rays pointing to the two directions, the angle between the rays pointing to the two directions projected onto the ground plane, and as a set of two angles (azimuth and elevation) describing their relative angle with respect to two orthogonal axes.

Alternatively, as discussed herein with reference to FIG. 3, the celestial element 170 (e.g., the sun) may not be present, but visual features of the celestial element 170 may be in the physical environment and/or the captured image (e.g., light rays 172, shadow 180, and the like). For example, during the daytime, the sun may not be directly in view of the camera image, but sunlight rays (e.g., light rays 172) and/or corresponding shadows (e.g., shadow 180) maybe shown. Thus, when the celestial element 170 is not present in the view of the image sensors, but visual features of the celestial element 170 are in view, the processes described herein can utilize those visual features of the celestial element 170 to determine the global reference direction 402 relative to the known direction 302 from the electronic device 120 (e.g., its image sensor) to the celestial element 170. For example, determine the global reference direction 402 based on shadow trajectory calculation techniques for a particular time of day and at the particular geographic location of the electronic device at the time of image capture.

Figure 5:
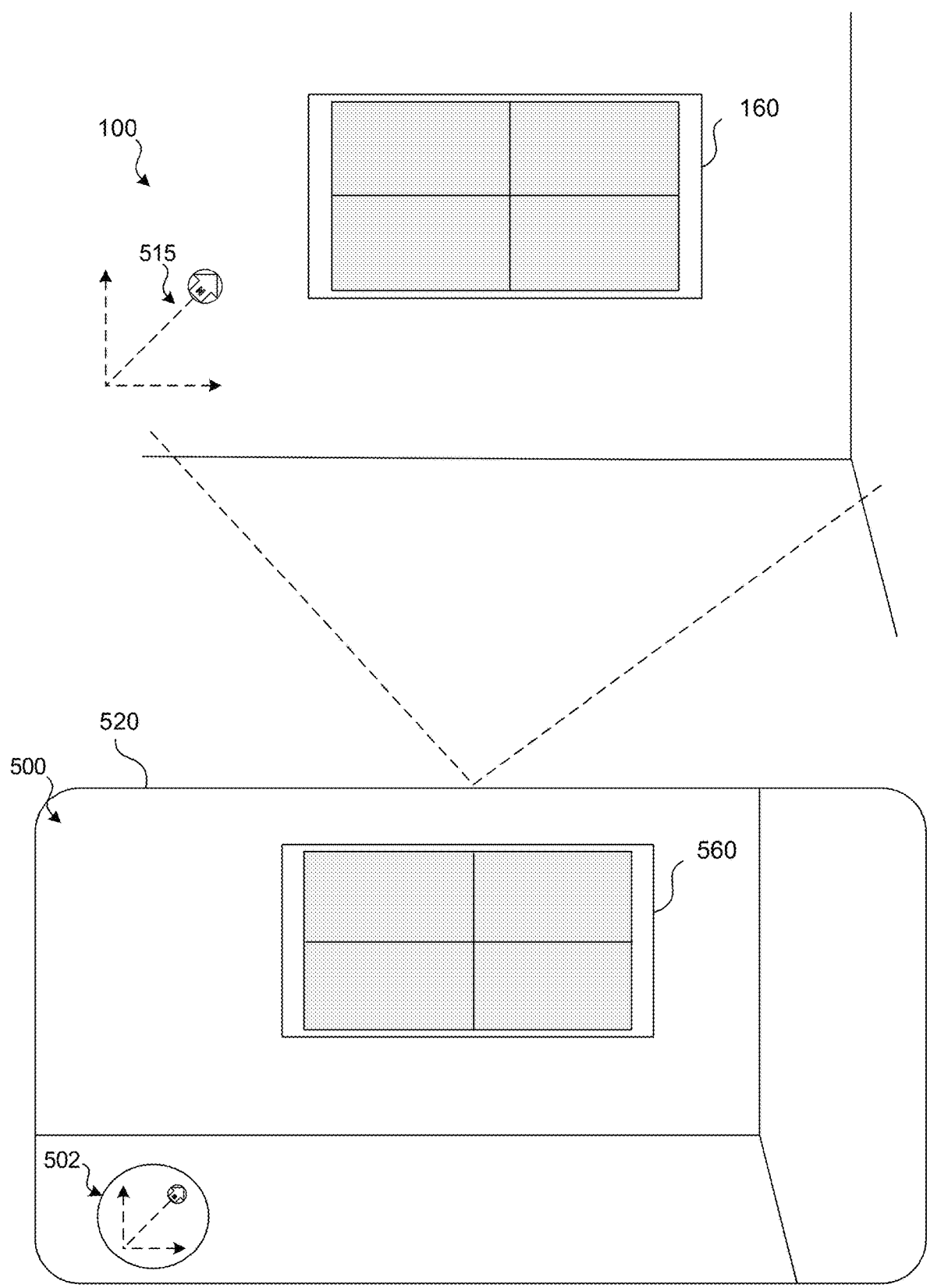
FIG. 5 illustrates an exemplary three-dimensional (3D) environment generated based on the physical environment of FIG. 1, in accordance with some implementations.
Figure 6:
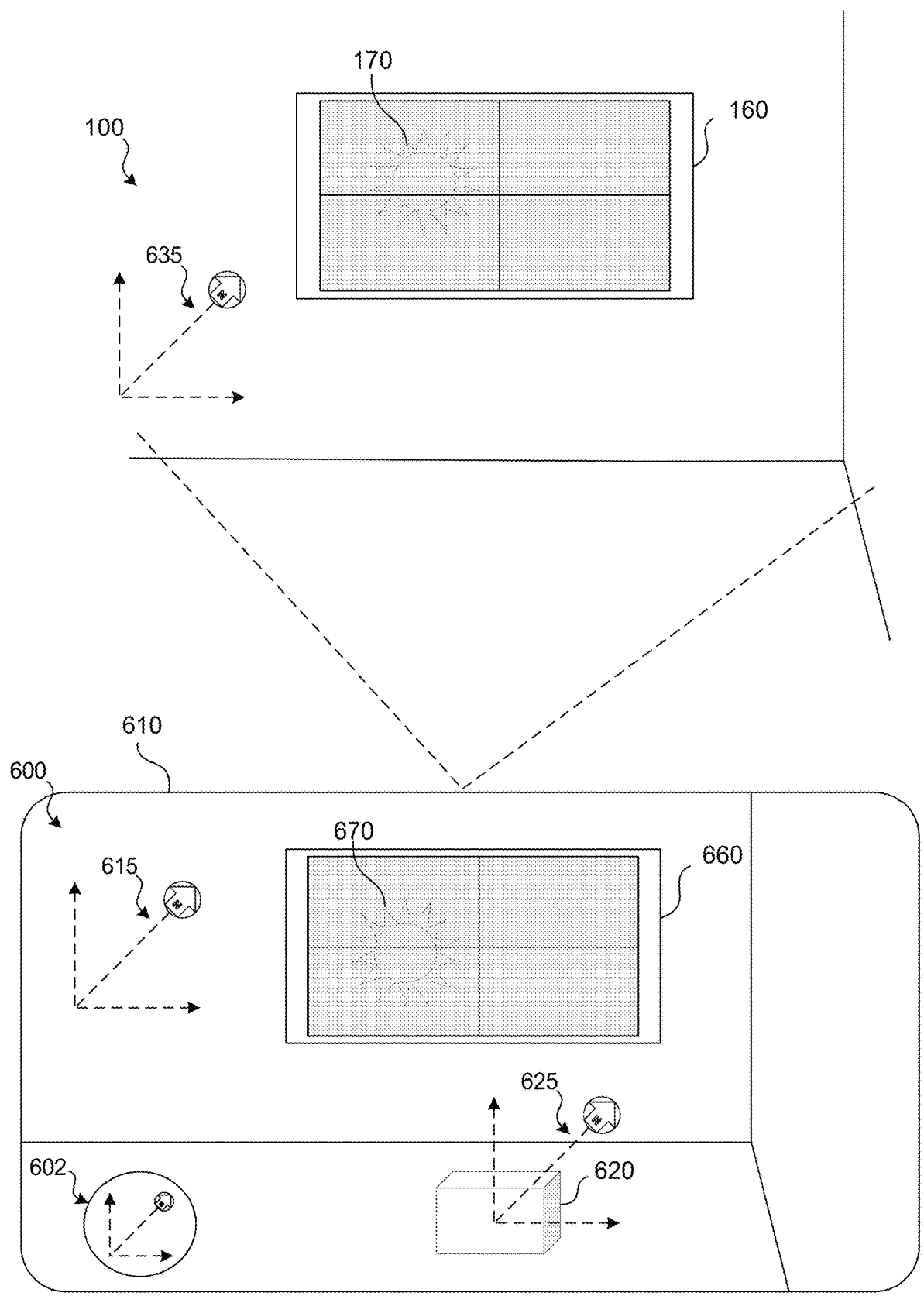
FIG. 6 illustrates an example view provided by the device of FIG. 1, the views including a 3D object within a 3D environment generated based on the physical environment of FIG. 1, in accordance with some implementations.

The orientation of a 3D model with respect to a physical environment can be used in various ways. FIGS. 5 and 6 illustrates a few of the many potential uses of 3D model orientation with respect to a global reference direction.

FIG. 5 illustrates an exemplary view 500 of the physical environment 100 provided by electronic device 520. The view 500 may be a live camera view of the physical environment 100, a view of the physical environment 100 through a see-through display, or a view generated based on a 3D model corresponding to the physical environment 100, such as the 3D model generated via the process discussed with respect to FIGS. 3 and 4. The view 500 includes depictions of aspects of a physical environment 100 such as a representation 560 of window 160. The electronic device 520 determines a global reference direction 515 in the physical environment 100 by matching the view 500 of the physical environment (i.e., the current environment) with the 3D model of the physical environment based on a global reference direction associated with the 3D model. The matching between the 3D model and the current environment (e.g. based on an image of the current environment, e.g. resulting in an estimate of the orientation of the image sensor that captured the image of the environment relative to the 3D model of the environment) may be determined when other techniques for determining global reference direction in the physical environment 100 are not available, e.g., when a magnetometer of the electronic device 520 is not providing accurate direction and the sun is no longer visible to use as a directional guide, as illustrated in FIG. 5. For example, the matching may occur after the celestial element (e.g., the sun) has disappeared from view of the device 520 (e.g., during the night). In this example, the view 500 includes a virtual compass 502 that may be displayed in the view 500 based on the determined global reference direction 515 (e.g., "true north") of the physical environment 100.

FIG. 6 illustrates an exemplary view 600 of a 3D environment provided by device 610. The view 600 is generated based on a 3D model of the physical environment 100 and a second 3D model corresponding to an object. Based on the 3D model of the physical environment, the view 600 depicts aspects of a physical environment 100 such as representations 660 and 670 of window 160 and celestial element 170, respectively, of FIG. 1. Based on the second 3D model, the view 600 includes virtual object 620 depicting the object represented by the second 3D model. Each of these models (i.e., the model of the physical environment 100 and the model of the object) is associated with a global reference direction, e.g., true north. These global reference directions are used to provide the view 600, for example, by directionally aligning the 3D model of the physical environment 100 with the object in the view 600. The global reference direction 615 of the 3D model is aligned (e.g., parallel) with the global reference direction 625 of the object. In addition, in this example, the view is provided while device 610 is within the physical environment 100. Thus, the view of the 3D model of the physical environment and the second 3D model is directionally aligned with the global reference direction 635 of the physical environment 100. In this example, the view 600 further includes a compass 602 that may be displayed to show a global reference direction (e.g., "true north").

FIG. 6 illustrates an example of combining two 3D models (e.g., of a room and an object), both associated with a global reference direction. The global reference direction 615 of the 3D environment in view 600 is compared and aligned with the global reference direction 625 of virtual object 620 in order to combine the two 3D models accurately, i.e., in a directionally-aligned manner. In a similar way, any number of 3D models associated with global reference direction may be aligned with one another. In some implementations, an environment is provided that combines numerous aligned 3D models to provide a realistic and otherwise desirable user experience. As a concrete example, in the situation shown in FIG. 6, techniques described herein may be used to determine the orientation of a 3D model of the physical environment 100 with respect to true north, and an image sensor localization method may be used to determine the orientation of the view 600 with respect to the 3D model (based on an image). Given these two known orientations, the orientation of the view 600 with respect to true north can be determined, which as a result enables the alignment of virtual object 620 in view 600 with true north. As an example, if the virtual object 620 represents (a map of) a city, it might be advantageous to visualize that (map of the) city aligned with true north as opposed to in an arbitrary orientation.

Figure 7:
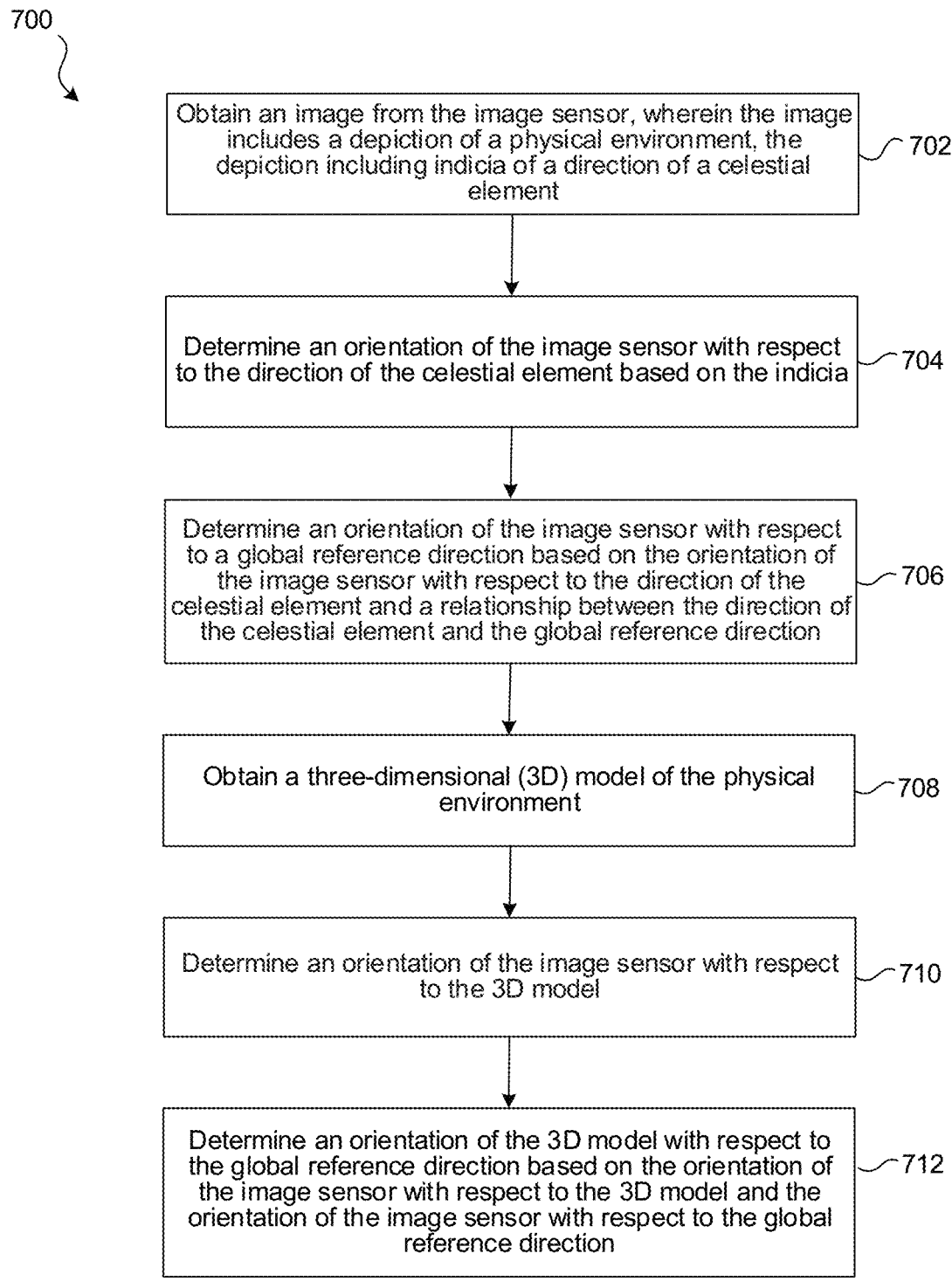
FIG. 7 is a flowchart representation of an exemplary method that determines a 3D model's orientation with respect to a global reference direction, in accordance with some implementations.

FIG. 7 is a flowchart representation of an exemplary method 700 that determines a 3D model's orientation with respect to a global reference direction in accordance with some implementations. In some implementations, the method 700 is performed by a device (e.g., device 120 of FIG. 1), such as a mobile device, head-mounted device (HMD), desktop, laptop, or server device. In some implementations, the method 700 is performed by processing logic, including hardware, firmware, software, or a combination thereof. In some implementations, the method 700 is performed by a processor executing one or more instruction sets stored in a non-transitory computer-readable medium (e.g., a memory).

For example, implementations described herein for method 700 orient a 3D model (e.g., a 3D reconstruction including a textured mesh or a sparse point cloud of a real world object, room, or scene) with respect to a global reference direction (e.g., true north) based on image data that includes an indicium of a celestial element (e.g., sun, moon, North Star). This may involve determining a camera's orientation relative to the direction of the sun based on where the sun is depicted in an image, determining the camera's orientation relative to true north based on where true north currently is relative to the current sun direction, and using this camera orientation relative to true north to orient 3D models generated using the camera's orientation relative to true north.

As an exemplary implementation of method 700, given a current date and time, and a current (approximate) longitude and latitude of the camera (e.g., from GPS, WiFi, etc.), processes described herein can compute at which angle with respect to true north the sun currently is located. Thus, if the sun is observed directly in at least one camera image, and the pose of that camera image with respect to the 3D model is known, then processes described herein can derive the orientation of the 3D model with respect to true north. Additionally, or alternatively, the orientation of the sun can be determined from other information in at least one tracked camera image (e.g., based on a casted shadow), then that information could also be utilized to determine the orientation of the 3D model with respect to true north.

At block 702, the method 700 obtains an image from the image sensor, wherein the image includes a depiction of a physical (e.g., real world) environment. In an exemplary embodiment, the depiction includes an indicium of a direction of a celestial element. In some implementations, a location of the celestial element in the image is detected based on the indicium (e.g., an indication of where the sun is located such as a shadow casted by sunlight). For example, the image 200 of FIG. 2 of the physical environment 100 includes a depiction 270 of the celestial element 170 (e.g., the sun), which can indicate the location and/or direction of the celestial element. In some implementations, the celestial element may include any celestial object, such as the sun, stars (e.g., the North star), the moon, planets, a sun shadow, and the like. In some implementations, the indicium of a direction of a celestial element may include sunbeams, crepuscular rays, antisolar rays, or anticrepuscular rays.

In some implementations, the indicium of the direction of the celestial element includes a casted shadow or a ray of light defined by an object in the physical environment. For example, during the daytime, the sun may be shining outside, but the sun may not actually be visible in the window, only sunlight and shadows can be visible. Thus, as illustrated in FIGS. 3 and 4, light rays 172 are illustrated as shining through the window 160 and casting a shadow 180. Based on shadow trajectory calculation techniques of the shadow 180, the direction of the celestial element 170 can be determined. The determined direction of the celestial element 170 can then be used to determine the global reference direction 402 relative to the known direction 302 from the electronic device 120 (e.g., its image sensor) to the celestial element 170 at a particular time of day and at the particular geographic location of the electronic device at the time of image capture. Additionally, in some implementations, the indicium of a direction of a celestial element may include sunbeams, crepuscular rays, antisolar rays, or anticrepuscular rays.

At block 704, the method 700 determines an orientation of the image sensor with respect to the direction of the celestial element based on the indicium. In some implementations, determining the orientation of the image sensor with respect to the direction of the celestial element based on the indicium is based on detecting the location and/or position of the celestial element relative in the image. For example, detecting the sun direction relative to a direction corresponding to a portion of the camera image, e.g., because the sun occupies certain pixels within the image, the sun direction relative to the direction corresponding to the center of the image is known. For example, an orientation of the image sensor with respect to the direction of the celestial element may be based on detecting that the sun direction is straight ahead in the image (e.g., image 200 of FIG. 2) and determining that the camera is oriented directly towards the sun.

A celestial element may be identified in an image and distinguished from other objects in the image (e.g., bright spots from other light sources) using one or more techniques. For example, in one exemplary embodiment, a machine learning model is trained to detect the celestial element in an image, given a set of training images with the celestial element and a known position of the celestial element. The machine learning model may be trained, for example, given an image, to regress to the pixel coordinates of the center of the celestial element and a confidence score it has that this is the celestial element. The machine learning model may be trained, for example, given an image, to regress to a probability map for every image pixel predicting how likely that pixel contains the celestial element.

In some implementations, the celestial element in an image is found by identifying bright pixels in an image. Identifying bright pixels may involve purposefully reducing the integration time and gain of the camera resulting in an image in which most surfaces in the environment (including artificial light sources) appear very dark and only the sun appears bright.

In some implementations, the camera is sensitive to the wavelengths that are present in spectrum of the light from celestial elements but not present in the spectrum of most common artificial light sources, e.g., in the infrared spectrum, and the celestial elements are distinguished from artificial light sources based on sensing light of those wavelengths and representing it in the image.

In some implementations, the celestial element is distinguished from artificial light sources by analyzing light intensity over time at high frequency. While the intensity of many artificial light sources oscillates or flickers, it remains almost static for the celestial element. In some implementations, the method 700 computes which size the circle of the celestial element must have when projected into the image, if, for example, given: (i) the known diameter of the celestial element, (ii) the known distance to the celestial element, and (iii) the known intrinsic camera parameters, such as the focal length. Additionally, the method 700 may only accept bright areas in the camera image as the celestial element if the observed size (e.g., radius) is close to the expected size (e.g., radius).

In some implementations, determining the orientation of the image sensor with respect to the direction of the celestial element is based on the detected location and/or position of the celestial element in the image and intrinsic camera parameters (e.g., focal length) of the image sensor. For example, knowledge of intrinsic camera parameters, in particular the focal lengths ($s_x$, $s_y$), sometimes also called scale factors, and principal point ($c_x$, $c_y$), are needed to determine given a 2D pixel position in the camera image the corresponding 3D ray pointing from the camera's optical center to the direction that projects into that pixel. For example, a 3D point X is projected into its 2D pixel location x by multiplying it with the camera matrix K, as illustrated in the equation:

$$K = \begin{bmatrix} s_x & 0 & c_x \\ 0 & s_y & c_y \\ 0 & 0 & 1 \end{bmatrix}.$$

Additionally, to determine for a 2D pixel position (at which the celestial element was detected) to the corresponding 3D ray in camera coordinates, the inverse, $K^{-1}$, is multiplied, as illustrated in the equation:

$$K^{-1} = \begin{bmatrix} 1/s_x & 0 & -c_x/s_x \\ 0 & 1/s_y & -c_y/s_y \\ 0 & 0 & 1 \end{bmatrix}$$

In some implementations, an orientation of the image sensor with respect to the direction of the celestial element may be based on detecting that the sun direction is 30 degrees to the right and 20 degrees up from the center of the image (e.g., image 200 of FIG. 2) and determining that the camera is oriented at an angle that is 30 degrees to the left and 20 degrees lower than the sun direction.

At block 706, the method 700 determines an orientation of the image sensor with respect to a global reference direction (e.g., true north) based on the orientation of the image sensor with respect to the direction of the celestial element and a relationship between the direction of the celestial element and the global reference direction. In some implementations, the method 700 further determines the relationship between the direction of the celestial element (e.g., sun direction) and the global reference direction (e.g., true north) based on a current time, a current date, and a current geographic location of the image sensor. For example, determining where true north is relative to the current sun direction.

At block 708, the method 700 obtains a 3D model of the physical environment. For example, a 3D model may include a 3D reconstruction (e.g., a physical room, or an object) based on a textured mesh, a sparse point cloud, a SLAM/VIO map, etc. For example, FIG. 6 illustrates a user's viewpoint of that reconstruction of the room of FIG. 1 with a virtual object 620 that is within view 600. In some implementations, the 3D model of the physical environment is based on one or more images from the image sensor (e.g., captured images from the electronic device. Alternatively, the 3D model may be scanned by the user with a different device (e.g., using a handheld device to capture the images, and wearing an HMD to view the 3D model). Alternatively, the 3D model may be generated and provided by another type of device (e.g., a laser scanner), or by manually modeling the 3D model using 3D modeling software.

At block 710, the method 700 determines an orientation of the image sensor with respect to the 3D model. For example, determining a current camera pose within the 3D model as part of a SLAM process or other 3D modeling process. Additionally, or alternatively, determining an orientation of the image sensor with respect to the 3D model is based on matching features of the image with features of the 3D model to identify at least part of a current pose of the image sensor. For example, features of the image data may be matched with features in the 3D model to identify a current camera pose (e.g., matching a depiction 260 of window 160 from image 200 with the representation 560 of the window of FIG. 5). Additionally, or alternatively, determining an orientation of the image sensor with respect to the 3D model is based on minimizing a photometric error between the image and (an image generated from) the 3D model.

Additionally, or alternatively, determining an orientation of the image sensor with respect to the 3D model is based on a machine learning model that regresses from the image to the position of parts of the 3D model in the image. Alternatively, determining an orientation of the image sensor with respect to the 3D model is based on a machine learning model that regresses from the image to pose parameters to identify a current pose of the image sensor.

At block 712, the method 700 determines an orientation of the 3D model with respect to the global reference direction based on the orientation of the image sensor with respect to the 3D model and the orientation of the image sensor with respect to the global reference direction. For example, implementations described herein orient a 3D model or reconstruction of a real-world environment (e.g., a room) with respect to a global reference direction (e.g., true north) based on image data that includes an indicium of a celestial element (e.g., sun). This may involve determining a camera's orientation relative to the direction of the sun based on where the sun is depicted in an image (e.g., image 200 of FIG. 2), determining the camera's orientation relative to true north based on where true north currently is relative to the current sun direction, and using this camera orientation relative to true north to orient 3D models generated using the camera images or to orient 3D models with known orientation with respect to the camera relative to true north.

In some implementations, the method 700 further involves merging multiple local 3D models into a single global 3D model. In an exemplary implementation, the 3D model is a first 3D model, and the method 700 further includes obtaining a second 3D model of at least part of the physical environment, determining an orientation of the image sensor with respect to the second 3D model, determining an orientation of the second 3D model with respect to the global reference direction based on the orientation of the image sensor with respect to the second 3D model and the orientation of the image sensor with respect to the global reference direction, and generating a third 3D model by merging the first 3D model and the second 3D model based on the orientation of each 3D model with respect to the global reference direction and the orientation of the image sensor with respect to the global reference direction. In an exemplary implementation, the second 3D model is different than the first 3D model (e.g., they contain different parts of the same scene). For example, two 3D models are generated from the same environment (e.g., the same physical room), but are generated from images that include different portions of that environment with some of the same overlapping areas.

In some implementations, the second 3D model is a different 3D model. For example, as illustrated in FIG. 6, the global reference direction 615 of the 3D environment in view 600 is compared and aligned with the global reference direction 625 of virtual object 620 in order to combine the two 3D models accurately, i.e., in a directionally-aligned manner. Merging multiple local 3D model into a single global 3D model is easier since there is (at least) one degree of freedom less to estimate.

In some implementations, the method 700 further involves illumination estimation when the sun is not currently observable (e.g., cloudy day, night time, etc.). In an exemplary implementation, the image is a first image, the method 700 further includes obtaining a second image from the image sensor, wherein the second image includes a second depiction of at least part of the physical environment that does not include indicium of a direction of a celestial element, determining an orientation of the image sensor while capturing the second image with respect to the 3D model, and determining an orientation of the image sensor while capturing the second image with respect to a global reference direction based on the orientation of the image sensor with respect to the 3D model and based on the orientation of the 3D model with respect to the global reference direction. For example, as illustrated in FIG. 5, the electronic device 520 determines a global reference direction 515 in the physical environment 100 by matching the view 500 of the physical environment (i.e., the current environment) with the 3D model of the physical environment based on a global reference direction associated with the 3D model, where the matching between the 3D model and the current environment may be determined when other techniques for determining global reference direction in the physical environment 100 are not available, e.g., when a magnetometer of the electronic device 520 is not providing accurate direction and the sun is no longer visible to use as a directional guide. Algorithms such as illumination estimation, can be used to derive the orientation of the sun (even if it is not currently observable) at a later point than the point at which the sun was observed given known true north with respect to the 3D model and given the current time, date, and approximate location (e.g. longitude and latitude) of the electronic device. The determined orientation of the sun can then be used to estimate the illumination in the scene, which in turn may be used to light virtual objects coherently with the illumination of the real (physical) environment.

Implementations of method 700 of having a 3D model's orientation with respect to a global reference direction, e.g., true north, can provide numerous advantages. For example, once such an orientation is known, an electronic device can match its current view of the physical environment with the 3D model and use the known orientation of the 3D model to determine the device's current orientation in the physical environment, e.g., which direction is true north. Increased orientation accuracy may be provided, for example, compared to orientation that provided by consumer-grade magnetometers, especially in indoor and other low accuracy circumstances. Accurately determining orientation in the physical environment may also facilitate navigation applications and applications, such as extended reality applications, that superimposes indications of where points of interest are (e.g., landmarks, cities, planets and stars, etc.).

Accurately determining orientation in the physical environment may also facilitate use of 3D models. For example, multiple 3D models (e.g., of two adjacent rooms) may be used in providing an extended reality (ER) environment. In one example, many 3D models are positioned in a large ER environment (e.g., corresponding to an entire neighborhood, city, country, or even planet), and accurately-determined orientations of the 3D models relative the physical environment may improve user experiences within that ER environment. Accurately-determined orientations of the 3D models may facilitate merging multiple local 3D models into a single global 3D model.

Another advantage is that 3D model scanning and orientation estimation can be decoupled. For example, a user might have scanned his or her room in some circumstances, such as during the night or a very cloudy day, such that the 3D model initially cannot be oriented in the physical environment. However, once the user uses the 3D model again during daylight on a sunny day, processes described herein can associate the 3D model and determine the orientation of the 3D model in the physical environment (e.g. with respect to a global reference direction) without having to rescan the entire room.

Figure 8:
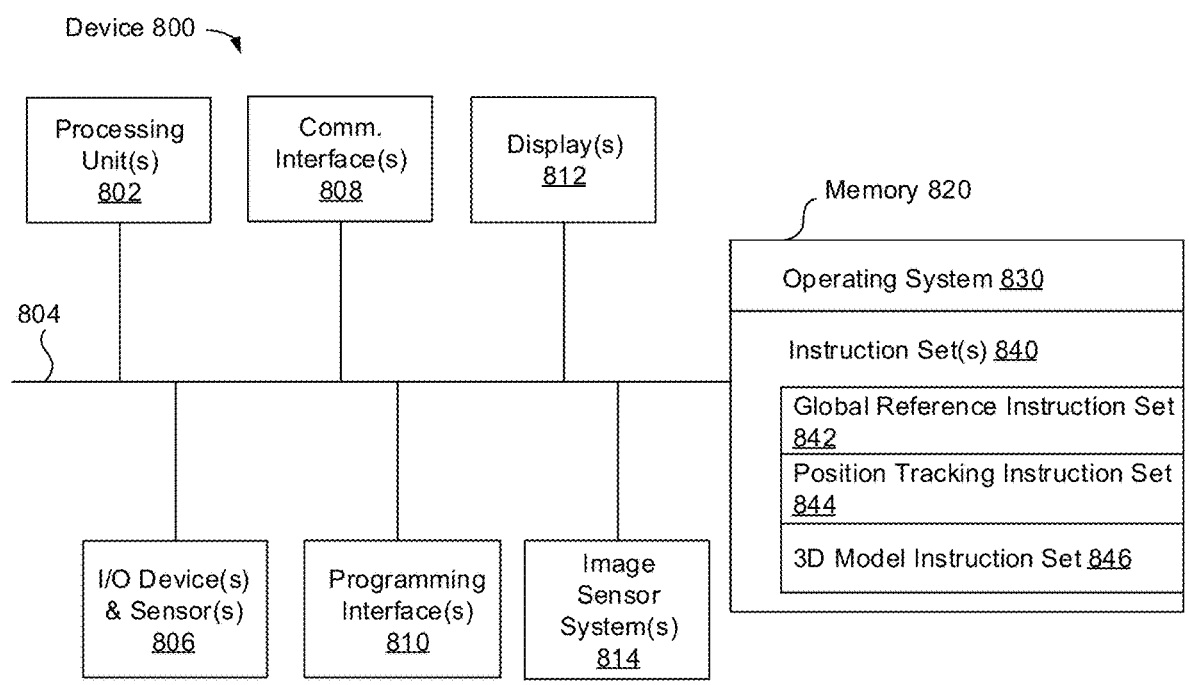
FIG. 8 is an example device, in accordance with some implementations.

FIG. 8 is a block diagram of an example device 800. Device 800 illustrates an exemplary device configuration for device 120 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 800 includes a single display. In another example, the device 800 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

In some implementations, the device 800 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 800 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 800.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a global reference instruction set 842, a position tracking instruction set 844, and a 3D model instruction set 846. The instruction set(s) 840 may be embodied as a single software executable or multiple software executables.

The global reference instruction set 842 is executable by the processing unit(s) 802 to implement a true north detection for orienting 3D models process in accordance with some implementations described herein. For example, the global reference instruction set 842 obtains an image that includes a depiction of a physical environment (e.g., physical environment 100 of FIG. 1) that includes an indicium of a direction of a celestial element (e.g., the sun) and determines an orientation of a 3D model (e.g., representations 560 of the 3D environment of view 500 of FIG. 5, virtual object 620 of FIG. 6, etc.) with respect to the global reference direction (e.g., true north) based on the orientation of an image sensor of a device (e.g., device 120) with respect to the 3D model and the orientation of the image sensor with respect to the global reference direction using techniques described herein.

The position tracking instruction set 844 is executable by the processing unit(s) 802 to obtain sensor data (e.g., light intensity image data, depth data, etc.) and track a location of a device (e.g. device 120) in a 3D coordinate system (e.g. of physical environment 100). For example, the position tracking instruction set 844 analyzes light intensity data from a light intensity camera, depth data from a depth camera, and/or other sources of physical environment information (e.g., camera positioning information from a camera's SLAM system, a VIO system, or the like) to track device location information for 3D model (e.g., 3D representations of virtual content generated for an XR experience, such as view 600 of FIG. 6).

The 3D model instruction set 846 is executable by the processing unit(s) 802 to obtain or generate 3D model data. For example, the 3D model instruction set 846 obtains tracking information for the device, image data (e.g., RGB and depth data), and other sources of physical environment information (e.g., camera positioning information from a camera's SLAM system, VIO, or the like), and generates 3D representation data using one or more techniques disclosed herein. For example, the 3D model instruction set 846 obtains localization data from the from position tracking instruction set 844, obtains other sources of physical environment information (e.g., camera positioning information), and generates a 3D representation (e.g., a 3D mesh representation, a 3D point cloud with associated semantic labels, or the like) for an XR experience (e.g., view 600 of FIG. 6).

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

A physical environment (e.g., physical environment 100) refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   at a device having a processor and an image sensor:
   obtaining an image from the image sensor, wherein the image comprises a depiction of a physical environment, the depiction including indicium of a direction of a celestial element;
   determining an orientation of the image sensor with respect to the direction of the celestial element based on the indicium;
   determining an orientation of the image sensor with respect to a global reference direction based on the orientation of the image sensor with respect to the direction of the celestial element and a relationship between the direction of the celestial element and the global reference direction;
   obtaining a three-dimensional (3D) model of the physical environment;
   determining an orientation of the image sensor with respect to the 3D model; and
   determining an orientation of the 3D model with respect to the global reference direction based on the orientation of the image sensor with respect to the 3D model and the orientation of the image sensor with respect to the global reference direction.

2. The method of claim 1, further comprising:
   determining the relationship between the direction of the celestial element and the global reference direction based on a current time, a current date, and a current geographic location of the image sensor.

3. The method of claim 1, wherein a location of the celestial element in the image is detected based on the indicium.

4. The method of claim 3, wherein determining the orientation of the image sensor with respect to the direction of the celestial element based on the indicium is based on detecting the location of the celestial element in the image.

5. The method of claim 4, wherein determining the orientation of the image sensor with respect to the direction of the celestial element is based on the detected location of the celestial element in the image and intrinsic camera parameters of the image sensor.

6. The method of claim 1, wherein the indicium of the direction of the celestial element comprises a casted shadow or a ray of light defined by an object in the physical environment.

7. The method of claim 1, wherein the 3D model is a first 3D model, the method further comprising:
   obtaining a second 3D model of at least part of the physical environment;
   determining an orientation of the image sensor with respect to the second 3D model;
   determining an orientation of the second 3D model with respect to the global reference direction based on the orientation of the image sensor with respect to the second 3D model and the orientation of the image sensor with respect to the global reference direction; and
   generating a third 3D model by merging the first 3D model and the second 3D model based on the orientation of the second 3D model with respect to the global reference direction and the orientation of the image sensor with respect to the global reference direction.

8. The method of claim 1, wherein the image is a first image, the method further comprising:
   obtaining a second image from the image sensor, wherein the second image comprises a second depiction of at least part of the physical environment that does not include indicium of a direction of a celestial element;
   determining an orientation of the image sensor while capturing the second image with respect to the 3D model; and
   determining an orientation of the image sensor while capturing the second image with respect to a global reference direction based on the orientation of the image sensor with respect to the 3D model and based on the orientation of the 3D model with respect to the global reference direction.

9. The method of claim 1, wherein determining an orientation of the image sensor with respect to the 3D model is based on matching features of the image with features of the 3D model to identify a current pose of the image sensor.

10. The method of claim 1, wherein determining an orientation of the image sensor with respect to the 3D model is based on minimizing a photometric error between the image and the 3D model.

11. The method of claim 1, wherein determining an orientation of the image sensor with respect to the 3D model is based on a machine learning model that regresses from the image to a position of parts of the model in the image.

12. The method of claim 1, wherein determining an orientation of the image sensor with respect to the 3D model is based on a machine learning model that regresses from the image to pose parameters to identify at least part of a current pose of the image sensor.

13. The method of claim 1, wherein the global reference direction is a true north direction.

14. The method of claim 1, wherein the celestial element is one of a sun, a moon, and a North Star.

15. The method of claim 1, wherein the 3D model is based on one or more images from the image sensor.

16. The method of claim 1, wherein the 3D model is a 3D reconstruction based on at least one of a simultaneous localization and mapping (SLAM) map, a visual inertial odometry (VIO) map, and a 3D mesh.

17. A device comprising:
   a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining an image from an image sensor, wherein the image comprises a depiction of a physical environment, the depiction including indicium of a direction of a celestial element;

determining an orientation of the image sensor with respect to the direction of the celestial element based on the indicium;

determining an orientation of the image sensor with respect to a global reference direction based on the orientation of the image sensor with respect to the direction of the celestial element and a relationship between the direction of the celestial element and the global reference direction;

obtaining a three-dimensional (3D) model of the physical environment;

determining an orientation of the image sensor with respect to the 3D model; and determining an orientation of the 3D model with respect to the global reference direction based on the orientation of the image sensor with respect to the 3D model and the orientation of the image sensor with respect to the global reference direction.

18. The device of claim 17, wherein the instructions, when executed on the one or more processors, further cause the one or more processors to perform operations comprising:

determining the relationship between the direction of the celestial element and a global reference direction based on a current time, a current date, and a current geographic location of the image sensor.

19. The device of claim 17, wherein a location of the celestial element in the image is detected based on the indicium.

20. A non-transitory computer-readable storage medium, storing program instructions executable by one or more processors to perform operations comprising:

obtaining an image from an image sensor, wherein the image comprises a depiction of a physical environment, the depiction including indicium of a direction of a celestial element;

determining an orientation of the image sensor with respect to the direction of the celestial element based on the indicium;

determining an orientation of the image sensor with respect to a global reference direction based on the orientation of the image sensor with respect to the direction of the celestial element and a relationship between the direction of the celestial element and the global reference direction;

obtaining a three-dimensional (3D) model of the physical environment;

determining an orientation of the image sensor with respect to the 3D model; and determining an orientation of the 3D model with respect to the global reference direction based on the orientation of the image sensor with respect to the 3D model and the orientation of the image sensor with respect to the global reference direction.

* * * * *